US009811681B2

(12) United States Patent
Landqvist et al.

(10) Patent No.: US 9,811,681 B2
(45) Date of Patent: Nov. 7, 2017

(54) METHOD AND SYSTEM FOR PROVIDING ACCESS TO A DEVICE FOR A USER

(71) Applicant: Sony Mobile Communications Inc., Tokyo (JP)

(72) Inventors: Magnus Landqvist, Lund (SE); Pär-Anders Aronsson, Malmö (SE); Ola Thörn, Limhanm (SE)

(73) Assignee: Sony Mobile Communications Inc., Tokyo (JP)

( * ) Notice: Subject to any disclaimer, the term of this patent is extended or adjusted under 35 U.S.C. 154(b) by 62 days.

(21) Appl. No.: 14/810,685

(22) Filed: Jul. 28, 2015

(65) Prior Publication Data
US 2017/0032137 A1 Feb. 2, 2017

(51) Int. Cl.
*G06F 21/00* (2013.01)
*G06F 21/62* (2013.01)
(Continued)

(52) U.S. Cl.
CPC .......... *G06F 21/6218* (2013.01); *G06F 3/013* (2013.01); *G06F 3/017* (2013.01);
(Continued)

(58) Field of Classification Search
CPC .... G06F 21/316; G06F 21/32; G06F 21/6218; G06F 21/36; G06F 3/013;
(Continued)

(56) References Cited

U.S. PATENT DOCUMENTS

| 2008/0003554 A1* | 1/2008 | Macri | G09B 5/00 |
| | | | 434/257 |
| 2008/0072293 A1* | 3/2008 | D'Urso | G06F 21/31 |
| | | | 726/4 |

(Continued)

OTHER PUBLICATIONS

Maeder, A., Gaze Based User Authentication for Personal Computer Applications, Oct. 2004, Proceedings of 2004 International Symposium on Intelligent Multimedia, Video and Speech Processing, pp. 727-730.*

(Continued)

*Primary Examiner* — Don Zhao
(74) *Attorney, Agent, or Firm* — Myers Bigel, P.A.

(57) ABSTRACT

The present invention relates to a method and system for providing access to a device for a user. The method comprises the steps of receiving an access attempt from the user to the device, identifying the user attempting to access the device, retrieving personal information from a database related to the user, the personal information comprising personal traits of the user, selecting a visual challenge configured based on the personal information, issuing the visual challenge to the user, receiving visual input corresponding to an eye-movement of the user relating to the visual challenge, determining whether the user passed the visual challenge based on the received visual input corresponding to an eye movement of the user, and allowing access to the device for the user if the user passes the visual challenge, or denying access to the device for the user if the user fails the visual challenge.

14 Claims, 3 Drawing Sheets

(51) Int. Cl.
  *G06F 3/01* (2006.01)
  *G06F 21/32* (2013.01)
  *G06F 21/36* (2013.01)
  *G06K 9/00* (2006.01)
  *G06F 21/31* (2013.01)

(52) U.S. Cl.
  CPC .......... *G06F 21/316* (2013.01); *G06F 21/32* (2013.01); *G06F 21/36* (2013.01); *G06K 9/0061* (2013.01); *G06F 2221/2101* (2013.01)

(58) Field of Classification Search
  CPC ....... G06F 17/30277; G06F 2221/2147; G06F 2221/2141; G06F 2221/2105; G06F 3/017; G06F 2221/2101; G06K 9/0061; G06K 3/013; G06K 9/00617
  See application file for complete search history.

(56) References Cited

U.S. PATENT DOCUMENTS

| | | | | |
|---|---|---|---|---|
| 2008/0209223 | A1* | 8/2008 | Nandy | G06F 21/36 713/185 |
| 2010/0085462 | A1* | 4/2010 | Sako | G02B 27/017 348/333.01 |
| 2011/0109879 | A1* | 5/2011 | Palti-Wasserman | A61B 3/113 351/209 |
| 2011/0289426 | A1* | 11/2011 | Sonstegard | G06Q 10/10 715/745 |
| 2013/0336547 | A1* | 12/2013 | Komogortsev | A61B 5/117 382/117 |
| 2014/0310803 | A1* | 10/2014 | Irie | G06F 21/32 726/19 |
| 2014/0351926 | A1* | 11/2014 | McCloskey | G06F 21/316 726/19 |
| 2015/0084864 | A1 | 3/2015 | Geiss et al. | |
| 2015/0135309 | A1* | 5/2015 | Karmarkar | G06F 21/36 726/19 |

OTHER PUBLICATIONS

International Search Report Corresponding to International Application No. PCT/IB2016/050194; dated: Mar. 23, 2016; 4 Pages.

* cited by examiner

METHOD AND SYSTEM FOR PROVIDING ACCESS TO A DEVICE FOR A USER

TECHNICAL FIELD

The present disclosure generally relates to the field of methods and systems for providing access to a device for a user.

BACKGROUND OF THE INVENTION

There are several known system and methods to ensure that a user trying to access a device is trusted and/or correctly identified, such as passwords, electronic keys and the like. Recently, biometric technologies have become commonplace, such as fingerprints and iris recognition. Iris recognition is considered one of the most trusted authentication technologies. Iris recognition is for example used as an alternative to standing in the line showing your passport in United Arab Emirates and at Amsterdam airport. The technology is based on comparing an image of the iris with a stored template. Typically only a 1 mega pixel camera is required with a removed IR filter, and an IR diode. Recently iris recognition has also started appearing in mobile communication devices, e.g. smartphones. A related technology is sclera recognition where the blood vessels of the eye white is scanned.

Artificial eyes in the form of porcelain, or lenses with a printed iris or sclera are known ways of attacking iris or sclera based security. One way of mitigating this is to add a text to read for the user while monitoring the eye movements. Thus the system verifies if it is a human eye by detecting typical reading patterns. This added security measure of detecting and verifying eye movements may be attacked by simulating such eye movement by using a camera with OCR detection to detect the text and a motor that control an artificial eye to simulate reading eye movements. Alternatively, the OCR detection could be used with a projection of an eye on a curved surface or display for simulating the eye movement.

Hence, there is still a general desire to provide a solution which may correctly identify a user attempting to access a device while making it more difficult to imitate the user in order to prevent access for unauthorized users.

SUMMARY OF THE INVENTION

In view of the above, an objective of the invention is to solve or at least reduce one or several of the drawbacks discussed above. Generally, the above objective is achieved by the attached independent patent claims.

According to a first aspect of the present invention, this and other objectives are achieved by a method for providing access to a device for a user. The method comprising the steps of receiving an access attempt from the user to the device, identifying the user attempting to access the device, retrieving personal information from a database related to the user, the personal information comprising personal traits of the user, selecting a visual challenge configured based on the personal information, issuing the visual challenge to the user, receiving visual input corresponding to an eye-movement of the user relating to the visual challenge, determining whether the user passed the visual challenge based on the received visual input corresponding to an eye movement of the user, and allowing access to the device for the user if the user passes the visual challenge, or denying access to the device for the user if the user fails the visual challenge.

The present invention is based on the realization that by issuing visual challenges based on personal information relating to a user and his or her personal traits provides a more secure method for user access to a device. The visual challenge is configured based on personal traits of the user. This makes the visual challenge difficult to bypass, through only imitating e.g. the biometrics of the user. Any attempt to access the device requires personal information comprising the personal traits of the user and possibly knowledge of how the user would react in order to pass the visual challenge and thereby access the device. Another advantage is that the visual challenges are unobtrusive for a user attempting to access the device, as the visual challenge only requires a small amount of interaction from the user. Further, unauthorized access attempt, e.g. by someone attempting to bypass the security, may be quickly identified as several access attempts which fail where the user should be able to pass the visual challenges. Hence, the visual challenge may change for each access attempt, and several access attempt which fail are thus likely to be access attempt by someone which is unauthorized. In other words, the invention may be seen as a method for providing access to a device for a user utilizing a real-time background check using a visual challenge based on personal information.

The device onto which the user tries to access may be any kind of mobile or non-mobile computing device. For example, the device may be a stationary computer, a laptop, a table, a smartphone, or a wearable computing device. Moreover, the device may be an entrance or passport authentication system.

The personal information related to the user may comprise information regarding the user's physical information such as age, sex, biometric identification markers, appearance, or non-physical information such as areas of expertise, or user history. Hence, the database may comprise stored templates used to identify the user as well as background information about the user. The database may also comprise a set of archetype challenges that together with the personal data is used to select a visual challenge based on the personal information. The archetype challenges may be similar for all users or generated in the database when at least some personal information is known.

In at least one exemplary embodiment, the step of selecting a visual challenge further comprises creating the visual challenge based on the personal information. Hence, the database may as mentioned comprise a number of archetype challenges that together with the personal data is used to create visual challenge based on the personal information for each access attempt by a user. For example, the personal data may comprise information that the user is proficient in chess at a certain skill level. The visual challenge may then be created or generated based on a chess archetype challenge, and the skill level of the user, and the visual challenge may be created directly when the information becomes available, or when needed, e.g. when the user performs an access attempt. Thereby, there is less possibility for an attacker to predict which type of visual challenge that will appear. Further, storage space and processing power may be saved until needed.

In at least one exemplary embodiment, receiving visual input from the user relating to the challenge comprises receiving at least one of eye-gaze direction of the user, a focus area for the eye-gaze of the user, and an eye-gaze direction of the user during a predetermined period of time. Hence, determining whether the user passed the challenge may be based on which the direction the user eye-gaze is directed, e.g. where in the visual challenge the user looks, or on which area the user focuses his eye gaze, i.e. a focus area, or whether the user focuses his or her eye-gaze for a predetermined period of time towards a specific area of the visual challenge. These may then be compared with an expected eye movement; e.g. an expected eye-gaze direction, an expected focus area, or an expected specific area of the visual challenge where the user should focus his eye-gaze for a predetermined amount of time.

The expected eye movement of the user could either be learnt, e.g. what the expected eye movement should be for a particular skill by observation and learning, or it could use a preconfigured database of expected eye movement for particular skill levels of a particular skill. It should be noted that by learning, the invention may make use of what is known as big-data and/or neural network algorithms which use a large number of examples to provide an expected response from a user and comparing the expected response with the received response, e.g. and received eye movement. This may of course depend on the type of challenge. For example, if the user is skilled in Chinese, the expected eye movement to a translation type task is suitable to be preconfigured by use of a dictionary database, but how the user's eye movement responds to a particular picture, artwork or scene is more suited to be learned during use of the invention to provide the expected eye movement.

In at least one exemplary embodiment, the personal traits comprise information regarding at least one specific area of expertise for the user. Hereby, the challenge may be based on a specific area of expertise for the user such as a language, proficiency in a skill, a learned ability, or a specific way of handling visual data.

In at least one exemplary embodiment, selecting the visual challenge comprises using the information regarding at least one specific area of expertise for the user to configure the visual challenge to be associated with the at least one area of expertise for the user. For example, the visual challenge may comprise presenting a text in language in which the user is proficient and following the eye-gaze of the user in order to determine whether the user actually reads the text in a correct manner. In a specific example, a user knowing Arabic or Chinese would read the text in a different manner than a device trying to imitate a western language. In another example, an experienced driver may be presented with a scene from within a car. It is well known that an experienced driver focuses and moves their eye-gaze differently than an inexperienced driver, e.g. farther forward in the field of view. In yet another example, a person proficient in a game such as chess analyses a presented chessboard in a specific manner compared to an inexperienced chess player.

In at least one exemplary embodiment, selecting the visual challenge comprises adding or removing artifacts within a scene representing at least one area of expertise for the user. Hereby, the user may quickly recognize either an artifact that is missing or is added to the scene. An artifact may refer to either a portion of a text, or an object within a scene.

In at least one exemplary embodiment, determining whether the user passed the challenge based on the received visual input from the user comprises detecting whether the user focuses an eye-gaze on at least one specific area of the visual challenge. Hence, a user with at least one specific area of expertise may focus his or her eye-gaze on a specific area of the visual challenge due to the fact that that area has been adapted for the visual challenge. For example, a user having proficiency in a specific language may be presented with a text where a word is misspelled or translated into another language. In another example, an experienced driver may be presented with a road sign which is misplaced, or a road sign which has text or figures thereon which are not present in the real world. In yet another example, a user proficient in game may be presented with an artifact in an area where it should not present, or a new type of model, or a move which would be illegal according to the known rules for playing the game.

In at least one exemplary embodiment, the personal traits comprise information regarding at least one physical capacity of the user. In at least one exemplary embodiment, selecting the visual challenge comprises using the information regarding a physical capacity of the user to configure the visual challenge to be associated with at least one physical capacity of the user. For example, a physical capacity may refer to the visual acuity of a user or the color vision of the user. Hence, the challenge may be configured with a portion that the user is not meant to see due to their visual acuity or lack of color vision, and if an attempt, e.g. a gaze direction is directed to such a portion of the visual challenge, it may be determined as an attempt to bypass the security measure. In such an embodiment, the expected eye movement of the user which is received in order to determine whether the user passes the visual challenge may be a generic search pattern through the visual challenge without detecting a change, or only receiving a eye movement which corresponds to a adaptation, e.g. a specific portion subjected to adaptation, of the visual challenge which the user should detect with his or her physical capacity.

In at least one exemplary embodiment, the method further comprises the step of logging the use of the device as information to the database to add information regarding the personal traits. The use of the device by the user may be logged in order to add information to the database regarding the personal traits. For example, the use of another language by the user may prompt the addition of another language to the personal traits. Similarly, if the user plays a certain game on the device the personal traits may be updated with expertise in that specific area. It may also be possible that by logging the use of the device that the database is updated with specific information from social media updates or user history. For example, the user may update his or her social media accounts with specific areas of expertise or activities which may correspond to certain areas of expertise. One example may be that the user searches for a certain route to drive, which may indicate that the user has a driver license. Another example may be that the user searches for certain in-depth information relating to certain skills such as math, accounting or programming.

In at least one exemplary embodiment, identifying the user comprises detecting a biometric characteristic of the user. Biometric detection is a secure process for identifying a user. Detecting a biometric characteristic may comprise detecting a fingerprint, a handprint, a blood type, the voice of the user, at least a partial DNA of the user, or other biometric characteristics relating to the appearance of the user. The aforementioned biometric characteristics may be detected automatically. In at least one alternative embodiment, identifying the user comprises receiving input from the user such as personal identification number, name, alias, and/or birth data. In other words, the user(s) may provide identification.

In at least one exemplary embodiment, the biometric characteristic is at least one of the iris or sclera of the user. As mentioned above, iris and/or sclera detection is a well known biometric characteristic. Another advantage is that physical equipment needed to detect the iris or sclera of the user may also be used for detecting the eye-movement and/or eye-gaze direction of the user.

According to a second aspect of the present invention, the objectives are also at least partly achieved by a computer program product comprising a computer-readable storage medium with instructions adapted to carry out the method according to the first aspect of the invention when executed by a device having processing capability.

According to a further aspect of the present invention, the objectives are also at least partly achieved by a system for providing access to a device for a user. The system comprises a device which the user is trying to access, an identification unit for identifying the user attempting to access the device, a database comprising information relating to the user, the information comprising personal traits, a visual challenge unit for selecting visual challenges configured based on the information, a display unit for issuing the visual challenge to the user, a visual input receiving unit receiving visual input corresponding to an eye-movement of the user relating to the visual challenge, a determination and authentication unit configured to determine whether the user passes the visual challenge based on the received visual input corresponding to an eye movement of the user, and allowing access to the device for the user if the user passes the visual challenge, or denying access to the device for the user if the user fails the visual challenge.

This further aspect may generally have the same features and advantages as the first aspect or second aspect.

In at least one exemplary embodiment, the visual input receiving unit comprises iris and or sclera detection, and the identification unit is formed by the visual input receiving unit.

In at least one exemplary embodiment, at least the database is remotely located. The database may thereby be accessed e.g. via a network by several different devices which requires the information regarding the user for selecting a challenge.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings The same reference numerals will be used for similar elements.

DETAILED DESCRIPTION OF EMBODIMENTS

In the present detailed description, embodiments of a method and system according to the present invention are mainly discussed with reference to schematic views showing a system and a flow chart outlining methods according to various embodiments of the invention. It should be noted that this by no means limits the scope of the invention, which is also applicable in other circumstances for instance with other types or variants of systems or devices than the embodiments shown in the appended drawings. Further, that specific components are mentioned in connection to an embodiment of the invention does not mean that those components cannot be used to an advantage together with other embodiments of the invention. The invention will now be described with reference to the enclosed drawings where first attention will be drawn to the structure, and secondly to the function.

Figure 1:
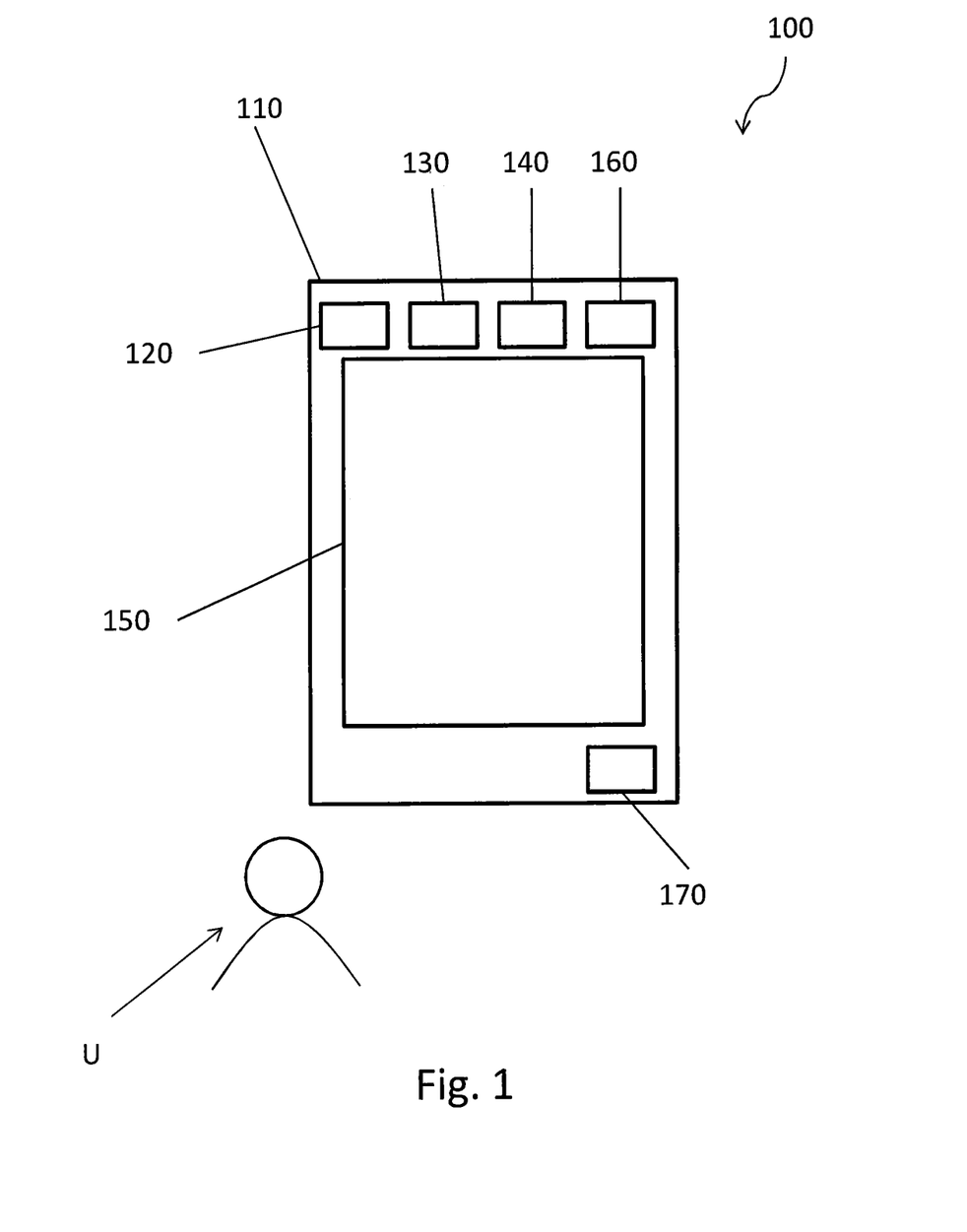
FIG. 1 shows a system for providing user access authentication according to at least one exemplary embodiments of the invention.

FIG. 1 show a system 100 for providing access to a device 110 for a user U. The device 110 comprises an identification unit 120 for identifying the user attempting to access the device 110, a database 130 comprising information relating to the user, the information comprising personal traits, a visual challenge unit 140, a display unit 150; a visual input receiving unit 160 receiving visual input corresponding to an eye-movement of the user relating to the challenge. The device 110 further comprises a determination and authentication unit 170, configured to determine whether the user passes the challenge based on the received visual input corresponding to an eye movement of the user, and allowing access to the device for the user if the user passes the challenge, or denying access to the device for the user if the user fails the challenge.

The system 100 may be wholly integrated in the device 110 as illustrated in FIG. 1, or be distributed with some parts and/or components remotely located. For example, some parts may be provided "on-demand" in the cloud, e.g. be provided when requested and be located be located remotely on a server or servers and be reached via a network interface such as the internet.

The device 110 is in this case a smartphone, where all the components and units are integrated. Hence, all the components should be understood to be connected either wired or wirelessly. The device 110 typically comprises communication means (not shown) which are generally understood to be wireless communication means using electromagnetic waves such a cellular networks, Bluetooth, WiFi, Zigbee or the like. The communication means may thus comprise components such as antennas, transceiver circuitry, amplifiers, filters and so on for sending and receiving electromagnetic waves. In order to perform computations and carry out instructions received via hardware, e.g. communications means or software from a machine-readable memory (not shown) the device 110 comprises a processor (not shown). At least some portions of the units 120, 130, 140, 160 may typically be embodied by software modules. The present invention is not restricted to any particular realization, and any implementation found suitable to realize the herein described functionality may be contemplated. The device 110 may of course comprise additional components such as the aforementioned machine-readable memory, both volatile and non-volatile, means for displaying information or media, e.g. a screen, and means for inputting information, such as a keyboard, a keypad, a directional pad, a mouse, a pen, a touch-screen and/or biometric mechanisms etc. The device 110 may be configured to send information to update the personal information in the database 130 by logging information regarding the use of the device 110 and any software being executed thereupon.

The identification unit 120 may be a front facing or backwards facing camera of the device 110. The camera 120 is configured to detect the iris and/or sclera of the user U and thereby detect the identity of the user U. In other embodiments it is possible that the identification unit 120 is another type of device that may detect other biometrics of the user U in order to identify the user U. In at least one optional embodiment, device 110 comprises input means. For example, the display unit 150 may be a touch-screen, or the device 110 has other physical and/or mechanical input means such as keys or a microphone onto which the user U may identify by entering information. The identification unit 120 is used to correlate the detected iris and/or sclera or entered information with e.g. stored templates in the database 130 for identifying the user U.

The database 130 comprises personal information relating to the user U. The personal information comprises the user's physical information such as age, sex, biometric identification markers, appearance, or non-physical information such as personal traits, areas of expertise, or user history. The database 130 may also comprise the information which is used by the identification unit 120 to identify the user, e.g. biometric information in stored templates. The database 130 may also comprise a number of archetype challenges that together with the personal data is used to create visual challenges based on the personal information.

The visual challenge unit 140 is configured to select a visual challenge based on the information relating to the user U. The visual challenge unit 140 may be configured to select a visual challenge from archetype visual challenges comprised in the database 130 and configure the chosen visual challenge using the personal information. Alternatively, the visual challenge unit 140 may be configured to create the visual challenge based on the personal information. For example, if the personal information indicates that the user has a driver's license the visual challenge unit 140 may select a visual challenge which presents a scene from within a car. In another example, a user having proficiency in a specific language may be presented with a text where a word is misspelled or translated into another language. In yet another example, a user proficient in game may be presented with an artifact in an area where it should not present or a move which would be illegal according to the known rules for playing the game.

The display unit 150 is configured to issue the visual challenge to the user U. In other words, the display unit 150 is used to present the visual challenge to the user U. The display unit may be any type of visual display unit such a screen utilizing LCD or OLED technology, e.g. the screen of a smartphone. The display unit 150 may be configured to utilize virtual reality or augmented reality.

The visual input receiving unit 160 is configured to receive visual input corresponding to an eye-movement of the user U relating to the challenge. The visual input receiving unit 160 may be configured to receive visual input from the user U relating to the challenge comprises receiving at least one of eye-gaze direction of the user, a focus area for the eye-gaze of the user, and an eye-gaze direction of the user during a predetermined period of time. Hence, the visual input receiving unit 160 may be integrated with the identification unit 120 and be formed by a forwards facing or backwards facing camera of the device 110.

The determination and authentication unit 170 is configured to determine whether the user passes the visual challenge based on the received visual input corresponding to an eye movement of the user. The determination and authentication unit 170 allows access to the device 110 for the user U if the user passes the visual challenge, or denies access to the device 110 for the user U if the user fails the visual challenge. If the user U is allowed access he or she may further access the content, software or other capabilities of the device 110. If the user U is denied access, he or she may make another attempt at accessing the device 110. Hence, the determination and authentication unit 170 may comprise a set of predetermined rules or thresholds which determines whether the user passes the visual challenge. Determining whether the user passed the challenge may be based on which the direction the user eye-gaze is directed, e.g. where in the visual challenge issued to the user U on the display unit 150 the user U looks, or on which area of the visual challenge the user U focuses his eye gaze, i.e. a focus area, or whether the user U focuses his or her eye-gaze for a predetermined period of time towards a specific area of the visual challenge presented on the display unit 150. Hereby, it is understood that the visual challenge that is selected and issued to the user U may have an expected response from the user U such as an expected eye-gaze, or eye-gaze direction. The expected eye-gaze of the user could either be learnt, e.g. what the user gaze response should be for a particular skill by observation and learning, or it could use a preconfigured database of expected gaze response types for particular skill levels of a particular skill. It should be noted that by learning, the invention may make use of what is known as big-data or neural network algorithms which use a large number of examples to provide an expected response from a user and comparing the expected response with the received response, e.g. and eye-gaze direction.

Figure 2:
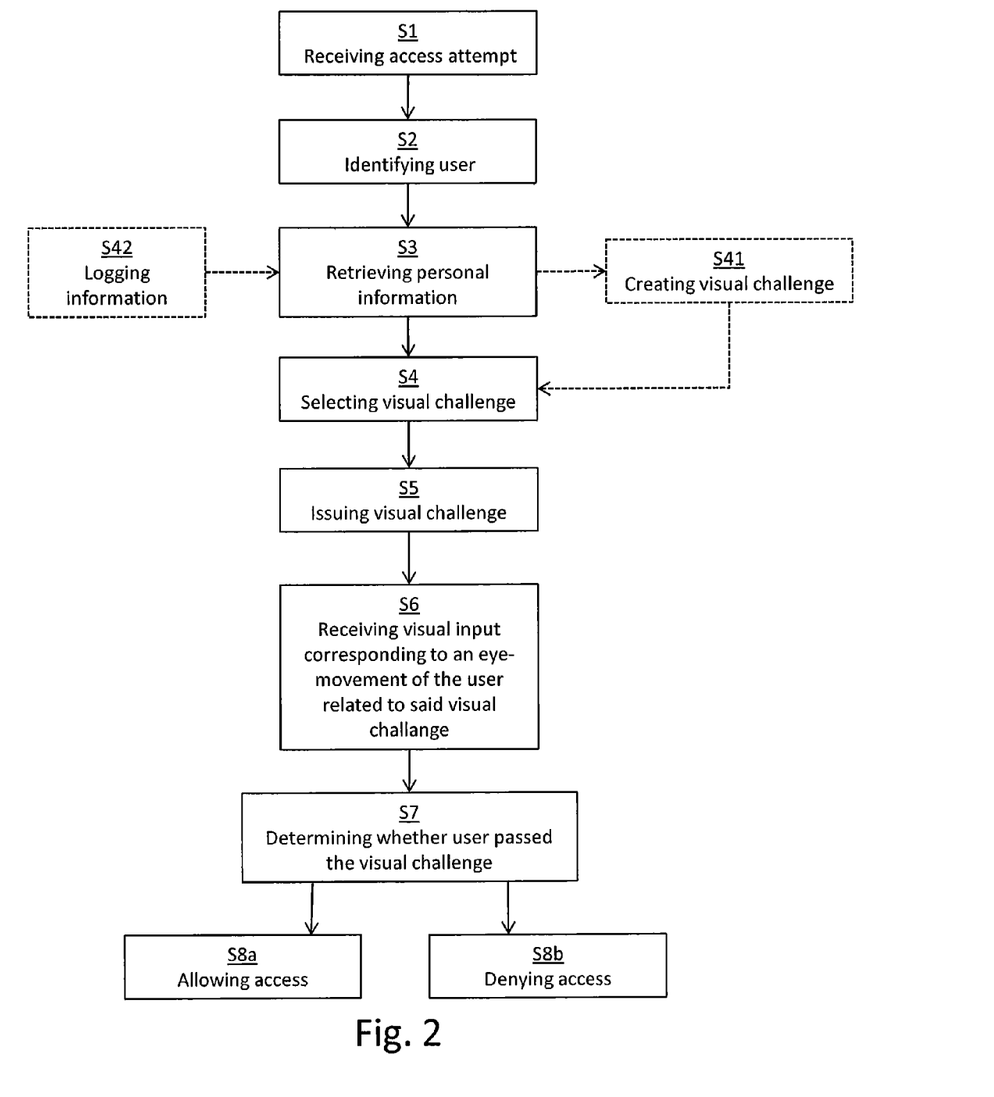
FIG. 2 shows a flow chart outlining a method according to at least one exemplary embodiment of the invention.

FIG. 2 shows a flowchart outlining a method according to at least one exemplary embodiment of the invention.

First, in step S1, a user U performs an access attempt which it received in by the device 110 which the user tries to access. The access attempt may be initiated by user U which taps the display unit 150, or otherwise uses some input means of the device 110.

Then, step S2 comprises identifying the user U attempting to access the device 110. The user U may be identified by any known means such as the user providing an alias, an e-mail, a personal identification number or another unique identifier. However, in at least one embodiment the user U is automatically identified by retrieving biometric data from the user U. The biometric data may retrieved by detecting the iris or sclera of the user U utilizing either the identification unit 120 or the visual input receiving unit 160. Identifying the user U is performed by comparing the biometric data with stored templates for users in e.g. the database 130.

Next, in step S3, when the user has been identified, personal data is retrieved from the database 130. The personal data relates to the user U, and the personal data comprises personal information comprising personal traits of the user. The personal traits comprise areas of expertise, skills, and/or user history. The personal traits may also comprise information regarding at least one physical capacity of the user, e.g. visual acuity or color vision.

Subsequent step S4 comprises selecting a visual challenge configured based on the personal information retrieved in the previous step. Selecting the visual challenge may comprise selecting an archetype visual challenge and configured the archetype visual challenge based on the personal information. For example, an archetype chess type challenge may be selected and configured based on the known level of expertise of the user U. In another example, a translation type visual challenge in selected and configured based on the language the user knows. A driver type challenge may be based on areas or scene which is not common for the driver, e.g. geographic location in other countries or the like. In other words, the visual challenge may be pre-generated or pre-determined and only partly adapted by using the personal information.

Alternatively, as indicated by the dashed arrows and box, the step of selection the visual challenge may comprises the step S41 of creating the visual challenge based on the personal information retrieved in the previous step S3. Hence, a visual challenge may be created, e.g. generated, each time an access attempt is detected by a user. This makes the system more random and e.g. secure as there is no specific list of visual challenges prepared which makes the system harder to predict. For example, a scene from commonly used software on the device 110 is shown with an artifact within the scene added or deleted in order to draw attention for someone, i.e. the user, with a high level of proficiency on that particular type of software. In another example, a scene from the neighborhood where the user lives or grew up may be presented where an artifact is added and/or deleted.

Step S5 comprises issuing the visual challenge to the user U. Typically the visual challenge is displayed on the display unit 150. Alternatively, the visual challenge may be displayed on another display, e.g. the device 110 stream the visual challenge to another display such as a TV or computer screen.

Subsequent step S6 comprises receiving visual input, by the visual input receiving unit 160, which corresponds to an eye-movement of the user U relating to the visual challenge presented on the display unit 150. The visual input may be at least one of eye-gaze direction of the user, a focus area for the eye-gaze of the user, and an eye-gaze direction of the user during a predetermined period of time.

Step S7 comprises determining whether the user passed the challenge based on the received visual input corresponding to an eye movement of the user U. Hence, the determining whether the user passed the challenge may be based on which the direction the user eye-gaze is directed, e.g. where in the visual challenge the user looks, or on which area the user focuses his eye gaze, i.e. a focus area, or whether the user focuses his or her eye-gaze for a predetermined period of time towards a specific area of the visual challenge. In another example, determining whether the user passed the challenge based on the received visual input from the user comprises detecting whether the user focuses an eye-gaze on at least one specific area of the visual challenge. Determining whether the user U passed the visual challenge may thus comprise utilizing a set of predetermined rules or thresholds in order to determine whether the eye movement of the user U corresponds to an expected eye movement. Hereby, it is understood that the visual challenge that is selected and issued to the user U may have an expected response from the user U such as an expected eye-gaze, or eye-gaze direction described previously.

If the user passed the visual challenge, access is allowed to the device for the user in step 8a. If the user U fails the challenge, access is denied to the device in step S8b. Step S8b may further comprises registering denied access attempt in order to determine whether false access attempt are being performed as a security attack. If that is the case, step S8b may further comprise sounding an alarm, notifying the correct authority or the like via a wired or wireless network and recording the surrounding of the device 110 by a microphone and/or camera.

During use of the device, an alternative step S42 may be performed. Step S42 comprise logging the use of the device 110 as information, e.g. personal information to add information regarding the personal traits. Thereby, the user history or areas of expertise of the user U may be updated in the database 130. The database 130 may also be updated by providing information from e.g. browser history or social media account connected to the user U.

Figure 3:
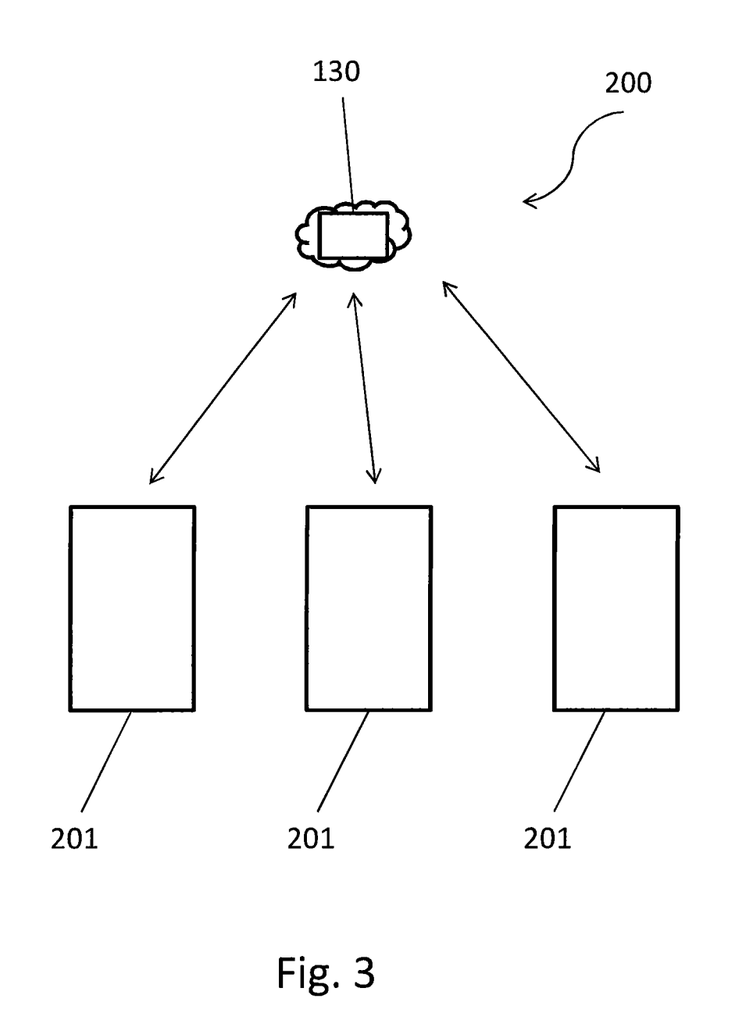
FIG. 3 shows another system for providing user access authentication according to at least one exemplary embodiments of the invention.

FIG. 3 shows another system 200 for providing user access authentication according to at least one exemplary embodiments of the invention. In the system shown in FIG. 3 the database 130 is remotely located, e.g. placed in a server and connected via a wired or wireless network(s). The database 130 may of course also be placed in a distributed environment on several servers. A plurality of devices 201 may utilize the database 130 in order to provide a user with visual challenges in each of the devices 201 of the plurality of devices. It should of course be noted that each of the devices 201 may be a different type of electronic device such as cell phones, tablets, laptops, computers, cars, passport-system, etc.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for providing access to a device for a user, said method comprising:
   receiving, by a processor of the device an access attempt from said user;
   identifying said user attempting to access said device;
   retrieving, from a database, personal information related to said user, said personal information comprising personal traits of said user;
   selecting, by a processor of the device, a visual challenge that is configured based on said personal information;
   issuing, by the processor of the device, said visual challenge that is configured based on said personal information to said user;
   receiving, by the processor of the device, visual input corresponding to an eye-movement of said user relating to said visual challenge;
   detecting, by the processor of the device, whether the eye-movement of said user focuses an eye-gaze on a predetermined portion of said visual challenge, wherein the predetermined portion of said visual challenge is derived based on the personal information related to said user;
   selectively allowing access to said device for said user responsive to detecting that the eye-movement of said user focuses the eye-gaze on the predetermined portion of said visual challenge; and
   selectively denying access to said device for said user responsive to detecting that the eye-movement of said user does not focus the eye-gaze on the predetermined portion of said visual challenge.

2. The method according to claim 1, wherein selecting said visual challenge further comprises creating said visual challenge based on said personal information.

3. The method according to claim 1, wherein receiving visual input from said user relating to said challenge comprises receiving at least one of:
   an eye-gaze direction of said user,
   a focus area for an eye-gaze of said user, and
   an eye-gaze direction of said user during a predetermined period of time.

4. The method according to claim 1, wherein said personal traits comprise information regarding at least one specific area of expertise for said user.

5. The method according to claim 4, wherein selecting said visual challenge comprises using said information regarding at least one specific area of expertise for said user to configure said visual challenge to be associated with said at least one area of expertise for said user.

6. The method according to claim 1, wherein said selecting said visual challenge comprises adding or removing artifacts within a scene representing at least one area of expertise for said user.

7. The method according to claim 1, wherein said personal traits comprise information regarding at least one physical capacity of said user.

8. The method according to claim 7, wherein selecting said visual challenge comprises using said information regarding a physical capacity of said user to configure said visual challenge to be associated with at least one physical capacity of said user.

9. The method according to claim 1, further comprising logging the use of said device as information to said database to add information regarding said personal traits.

10. The method according to claim 1, wherein identifying said user comprises detecting a biometric characteristic of said user.

11. A computer program product comprising a non-transitory computer-readable storage medium storing instructions which when run on a processor of a device cause the processor to perform operations comprising:
   receiving by a processor of the device an access attempt from said user;
   identifying said user attempting to access said device;
   retrieving, from a database, personal information related to said user, said personal information comprising personal traits of said user;
   selecting, by a processor of the device, a visual challenge that is configured based on said personal information;
   issuing, by the processor of the device, said visual challenge that is configured based on said personal information to said user;
   receiving, by the processor of the device, visual input corresponding to an eye-movement of said user relating to said visual challenge;
   detecting, by the processor of the device, whether the eye-movement of said user focuses an eye-gaze on a predetermined portion of said visual challenge, wherein the predetermined portion of said visual challenge is derived based on the personal information related to said user;
   selectively allowing access to said device for said user responsive to detecting that the eye-movement of said user focuses the eye-gaze on the predetermined portion of said visual challenge; and
   selectively denying access to said device for said user responsive to detecting that the eye-movement of said user does not focus the eye-gaze on the predetermined portion of said visual challenge.

12. A system for providing access for a user, said system comprises:
   a device which said user is trying to access;
   a database comprising information relating to said user, said information comprising personal traits of said user;
   a processor configured to identify said user attempting to access said device, and configured to select visual challenges based on said information;
   a display configured to provide a selected one of said visual challenges to said user, wherein the selected one of the visual challenges is determined by the processor; and
   a visual input receiver configured to receive visual input corresponding to an eye-movement of said user relating to the selected one of said visual challenges,
   wherein the processor is further configured to perform operations comprising:
   detecting, by the processor of the device, whether the eye-movement of said user focuses an eye-gaze on a predetermined portion of said visual challenge that is derived based on the personal information related to said user;
   selectively allowing access to said device for said user responsive to detecting that the eye-movement of said user focuses the eye-gaze on the predetermined portion of said visual challenge; and
   selectively denying access to said device for said user if said user fails said visual challenge responsive to detecting that the eye-movement of said user does not focus the eye-gaze on the predetermined portion of said visual challenge, wherein the device comprises the processor, the display, and the visual input receiver.

13. The system according to claim 12, wherein said visual input receiver is configured to receive iris and/or sclera visual input, and wherein said processor identifies said user using said visual input receiver.

14. The system according to claim 12, wherein at least said database is remotely located from and networked to the device.

* * * * *